United States Patent Office.

KARL STEPHAN, OF BERLIN, GERMANY, ASSIGNOR TO CHEMISCHE FABRIK AUF ACTIEN, VORM. E. SCHERING, OF BERLIN, GERMANY.

PROCESS OF MAKING CAMPHENE.

SPECIFICATION forming part of Letters Patent No. 707,270, dated August 19, 1902.

Application filed January 18, 1902. Serial No. 90,358. (No specimens.)

*To all whom it may concern:*

Be it known that I, KARL STEPHAN, chemist, doctor of philosophy, a subject of the Emperor of Germany, residing at Berlin, Kingdom of Prussia, German Empire, have invented a new and useful Improvement in Processes of Manufacturing Camphene, of which the following is a specification.

It is known that camphene can be produced from pinene hydrochlorid (bornyl chlorid) or the corresponding hydro bromid or iodid by splitting off the hydrogen haloid. The known agents for accomplishing this are alcoholic potash, (Ribau and Berthelot,) potassium acetate, and glacial acetic acid, (Wallach, *Annalen der Chemie*, 239, page 6,) anilin, (Brühl, *Berichte der Deutschen Chem. Gesellschaft*, Vol. XXV, page 146,) caustic potash and burned magnesia, (Kachler, *Annalen der Chemie*, 197, page 96,) sodium alcoholate, (Wallach, *Annalen der Chemie*, 230, page 238,) distillation over lime, (Berthelot, *Ann. Chem. Phys.*, 1878, page 56,) heating with water under pressure, (Kachler, *Annalen der Chemie*, 197, page 96,) and heating with sodium benzoate or stearate, (Berthelot and Ribau.) None of these agents, however, act completely, the yield being small, and the camphene always contains chlorin on account of the pinene hydrochlorid mixed with it. Brühl even states that after treating pinene hydrochlorid (bornyl chlorid) with anilin for several hours at 200° Celsius no formation of camphene could be observed.

I have discovered that by the use of bases of the aliphatic group, to which group also heterocyclical bases are to be included—as, for instance, piperazin and piperidin—good yields (about eighty per cent. of the theoretical) of camphene can be obtained.

Example I: One hundred parts of pinene hydrochlorid (bornyl chlorid) are heated with one hundred and seven parts of an aqueous thirty-three-per-cent. solution of methylamin and four hundred parts of absolute alcohol for eight hours to 210° Celsius. Then in order to bind the excess of the base the mixture is acidified with sulfuric acid, the alcohol distilled off, and the camphene driven over with steam. The product obtained is entirely free from chlorin.

Example II: One hundred parts of pinene hydrochlorid are heated under pressure with fifty-two parts of dimethylamin dissolved in five hundred parts of absolute alcohol for twelve hours to from 200° to 210° Celsius. After heating the mixture is acidified with sulfuric acid, the alcohol distilled off, and the camphene, which is free from chlorin, driven over with steam.

Example III: One hundred parts of pinene hydrochlorid are heated with one hundred parts of piperazin for ten hours to 210° Celsius in a closed vessel, whereupon the process is continued as indicated above.

The process is carried out in the same way when diamylamin and piperidin are used. In all these cases camphene free from chlorin is obtained. The bases can be recovered from the distillation-lye in known ways and used again with fresh charges. When pinene hydrobromid and pinene hydroiodid are used, the process is carried out in an analogous manner. It is of course always preferable to use pinene hydrochlorid.

Example IV: Two hundred grams of pinene hydrobromid are heated with three hundred and fifty grams diamylamin for five hours at 250° Celsius. The product of reaction is acidified with sulfuric acid and the camphene formed driven over with steam. The further purification proceeds in the usual manner.

Example V: Heat three hundred grams pinene hydroiodid (see *Berichte der Deutschen Chem. Gesellschaft*, Vol. XXXII, page 2310) with two hundred and seventy-nine grams of piperidin for five hours at 200° Celsius and proceed as indicated above.

In order to define the term "camphene," it may be remarked that under this term it is intended to include hydrocarbons which are formed by splitting off water from borneol or isoborneol and which can be transferred back into borneol or isomeric borneols by hydration.

I claim as my invention—

1. Process of manufacturing camphene, which consists in heating hydrogen-haloid compounds of pinene with bases of the aliphatic group and isolating by known methods the camphene thus produced, substantially as set forth.

2. Process of manufacturing camphene, which consists in heating hydrogen-haloid compounds of pinene with bases of the aliphatic group, binding the excess of the base with an acid and isolating by known methods the camphene produced, substantially as set forth.

In testimony whereof I have signed my name to this specification in the presence of two subscribing witnesses.

KARL STEPHAN.

Witnesses:
    HENRY HASPER,
    WOLDEMAR HAUPT.